US008826052B1

United States Patent
Vaidya et al.

(10) Patent No.: US 8,826,052 B1
(45) Date of Patent: *Sep. 2, 2014

(54) METHODS AND APPARATUS FOR POWER MODE CONTROL FOR PDA WITH SEPARATE COMMUNICATIONS AND APPLICATIONS PROCESSORS

(75) Inventors: Priya Vaidya, Shrewsbury, MA (US); Moinul Khan, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 483 days.

This patent is subject to a terminal disclaimer.

(21) Appl. No.: 13/157,456

(22) Filed: Jun. 10, 2011

Related U.S. Application Data

(63) Continuation of application No. 11/956,088, filed on Dec. 13, 2007, now Pat. No. 7,962,775.

(60) Provisional application No. 60/884,325, filed on Jan. 10, 2007.

(51) Int. Cl.
*G06F 1/32* (2006.01)
(52) U.S. Cl.
USPC .......................... 713/323; 713/322; 713/324
(58) Field of Classification Search
CPC ... G06F 1/3243; G06F 1/3293; Y02B 60/121; Y02B 60/1214
USPC ................................................. 713/322–324
See application file for complete search history.

(56) References Cited

U.S. PATENT DOCUMENTS

| | | | |
|---|---|---|---|
| 4,862,407 A * | 8/1989 | Fette et al. | 712/35 |
| 5,142,684 A | 8/1992 | Perry et al. | |
| 5,669,003 A * | 9/1997 | Carmean et al. | 713/322 |
| 5,748,489 A * | 5/1998 | Beatty et al. | 709/208 |
| 6,141,762 A * | 10/2000 | Nicol et al. | 713/300 |
| 6,240,521 B1 | 5/2001 | Barber et al. | |
| 6,766,460 B1 | 7/2004 | Evoy et al. | |
| 2008/0072014 A1 | 3/2008 | Krishnan et al. | |

* cited by examiner

*Primary Examiner* — Thuan Du

(57) ABSTRACT

A mobile electronic communication device power management method and apparatus are disclosed for use in multiple processor hardware schemes having asymmetrical power demands between processors. Upon reaching an long duration idle state, a high-level processor with high power consumption requirements handling low-level system tasks updates a data set shared between processor subsystems containing information necessary to perform such low-level tasks. A proxy software module is initiated on a base-band processor with lower power consumption requirements. The proxy module accesses the shared data set and begins to control low-level system tasks, allowing the high-level processor to enter a dormant low power state. Upon the occurrence of a wake-up event, the high-level processor enters an active state. The shared data set is updated by the proxy software module and the proxy module is terminated. The high-level processor accesses the shared data set and resumes control of low-level system tasks.

21 Claims, 4 Drawing Sheets

METHODS AND APPARATUS FOR POWER MODE CONTROL FOR PDA WITH SEPARATE COMMUNICATIONS AND APPLICATIONS PROCESSORS

RELATED APPLICATIONS

This present disclosure is a continuation of U.S. application Ser. No. 11/956,088, filed on Dec. 13, 2007, which claims priority under 35 U.S.C. §119(e) to U.S. Provisional Application No. 60/884,325, filed on Jan. 10, 2007.

FIELD OF THE DISCLOSURE

The present disclosure relates generally to the field of mobile electronic communication devices and, more particularly, to a method and apparatus for managing power consumption by such devices.

BACKGROUND

Optimizing power consumption in modern mobile electronic communication devices (e.g., cell phones or personal digital assistants) has been a long-standing design consideration in the mobile electronics industry. Reduction in power consumption over time proves particularly important in mobile electronic communication devices that are battery-powered and intended for use over long durations between recharge cycles. To achieve this reduction in power consumption, many modern mobile devices implement a power management scheme that utilizes multiple operating power states (e.g., ON, STANDBY, IDLE, SLEEP). The state in which the mobile device operates can depend on a number of factors, including the number of active applications running on the device and mobile network connectivity. Each operating state typically has a corresponding operating power consumption level. Accordingly, by adjusting the state in which the mobile device operates, overall device power consumption may be optimized.

Many previous mobile electronic communication device operating systems require that the device remain in a high power consumption active state (e.g., ON), except in rare instances when there are no active high-level applications running on the device and mobile network connectivity has been disabled. This scheme proves extremely ineffective, however, in efficiently managing device power consumption. This design issue has been partially addressed by modern devices that implement a multiple processor design architecture. For example, many devices utilize a dual processor architecture having a high-level processor (e.g., an applications processor) capable of running high-level applications and active system tasks, and a base-band processor (e.g., a communications processor) capable of running communication subsystem tasks. In such an architecture, the high-level processor traditionally has higher power consumption requirements than the base-band processor. Lower total power consumption by the device can thus be achieved by reserving the high-level processor for running only necessary applications and system tasks.

In the previously described dual processor architecture, overall device power consumption can be drastically reduced by allowing the high-level processor to enter a dormant low power state during a long duration idle period when there are no high-level applications and regular low-level system tasks active. Current implementations, however, only allow the high-level processor to enter a dormant low power state periodically, and require that the high-level processor return to an active state to run regular low-level system tasks such as updating network signal strength or system-time. As a result, the potential benefits of a multiple processor architecture for reducing power consumption in a mobile electronic communication device are not fully achieved. A system for managing power consumption in a device having a plurality of processors, wherein said processors have asymmetric power consumption requirements, comprises means for transferring control of certain tasks from a first processor with first power consumption requirements to a proxy software module operating on a second processor with second power consumption requirements, wherein said first power consumption requirements are greater than said second power consumption requirements; and means for switching the first processor to a dormant power state.

It is accordingly an object of the invention to provide a power management scheme that allows a high-level processor with high power consumption requirements in a multiple processor mobile electronic communication device to enter into a dormant low power state without the need to periodically enter an active state to control regular low-level system tasks.

SUMMARY

Broadly speaking, this disclosure relates to power management in a multiple processor mobile electronic communication device utilizing processors having asymmetric power consumption requirements. The embodiments of the invention can be implemented in numerous ways, including a method, an apparatus, and a computer-readable medium storing computer programs executable by a computer to perform a method. Embodiments of the invention implemented in a dual processor mobile electronic communications device utilizing a high-level processor with high power consumption requirements and a base-band processor with lower power consumption requirements are discussed below.

In at least one embodiment, a power management scheme for reducing power consumption in a multiple processor mobile electronic communications device comprises transferring control of regular low-level system tasks from a high-level processor (e.g., an applications processor) with high power consumption requirements to a proxy software module operating on a base-band processor (e.g., a communications processor) with lower power consumption requirements. Regular low-level system tasks may include mobile network connection verification, mobile network signal strength updates, or system time updates. The proxy software module represents an application thread running on the base-band processor subsystem with the capability of running regular low-level system tasks independently from the high-level processor subsystem. When the high-level processor enters a long duration idle state, for example, by a lack of active high-level applications running on the high-level processor subsystem or by a user request (e.g., via general purpose input/outputs "GPIOs"), the process of transferring control of regular low-level system tasks from the high-level processor to the proxy software module is initiated. Transferring control of regular low-level applications from the high-level applications processor to the software proxy module comprises several steps. Prior to relinquishing control of regular low-level system tasks to the proxy software module, the high-level processor updates a data set shared between processor subsystems containing necessary information to run regular low-level system tasks (e.g., active IP addresses and port locations, network connection state information, system time). The proxy software module is then initiated, and after accessing the shared data set, takes control of running regular low-level system tasks from the high-level processor. Once control of regular low-level system tasks has been transferred to the proxy software module, the high-level processor may then be switched to a dormant low power state.

Upon the occurrence of a wake-up event, such as the initiation of a high-level application or a user request (e.g., via GPIOs), the high-level processor exits the dormant low power state and returns to the active state. The proxy software module then updates the shared data set containing necessary information to run regular low-level system tasks and terminates (i.e, becomes inactive). After accessing the shared data set, the high-level processor may then resume control of regular low-level system tasks.

In a multiple processor mobile electronic communication device having asymmetric power consumption requirements between processors, consistent with the principles of the present invention, the proxy software module running on the base-band processor can take independent control of running regular low-level system tasks, allowing the high level processor with high power consumption requirements to enter into a dormant low power state without the need to periodically enter an active state to control regular low-level system tasks, thereby reducing overall device power consumption.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Principles of embodiments of the present invention may be implemented by utilizing a proxy software module with the capability of controlling regular low-level system tasks running on the base-band processor in a multiple processor mobile electronic communications device. When the high-level processor enters a long duration idle state, control of regular low-level system tasks is transferred to the proxy software module, allowing the high-level processor to enter a dormant low power state until the occurrence of a wake-up event. In this way, the duration the high-level processor remains in the active state is reduced substantially as there is no requirement for the high-level processor to exit a dormant low power state to perform regular low-level system tasks. Accordingly, overall power consumption by a mobile electronic communications device implementing this scheme may be reduced.

Figure 1:
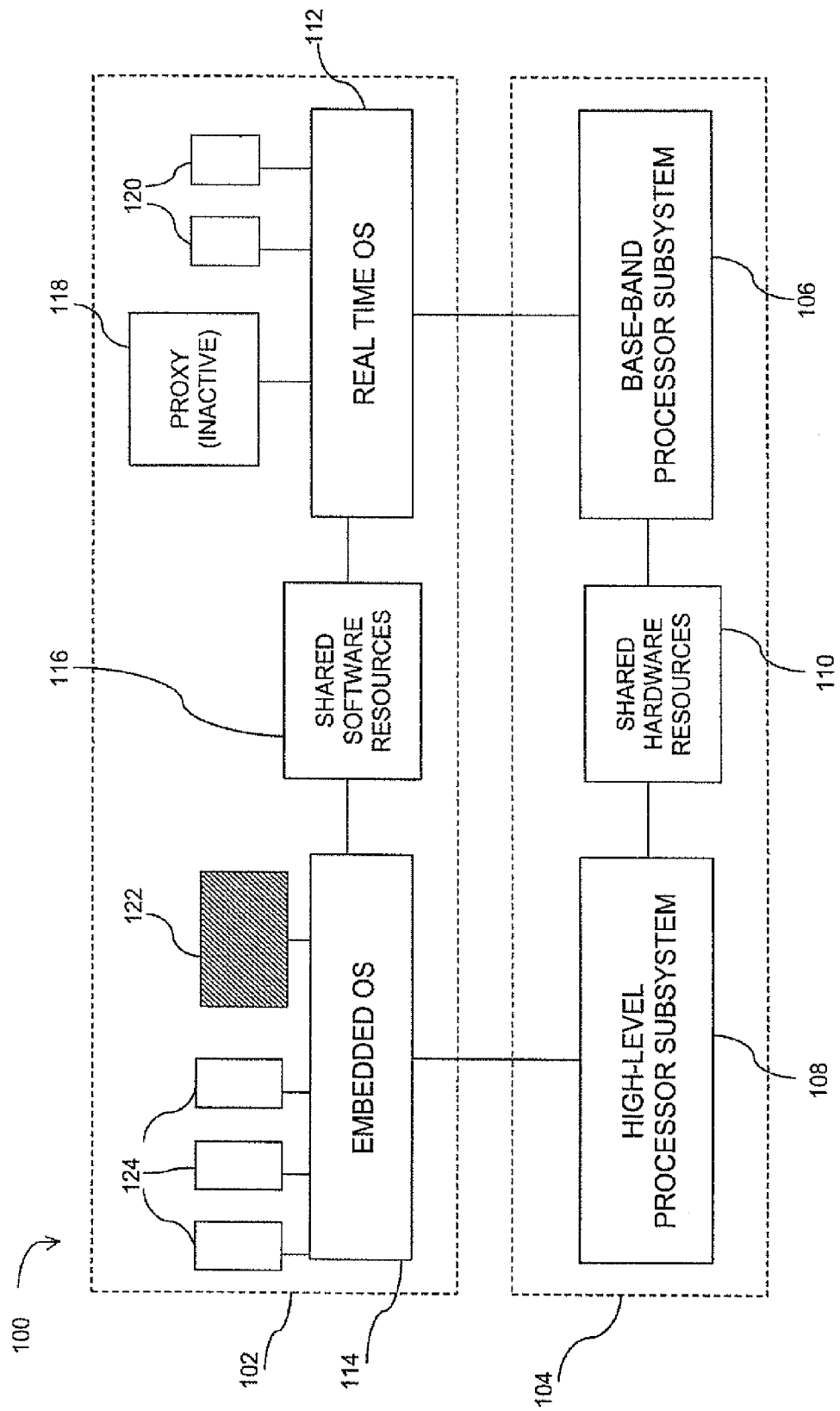
FIG. 1 is a functional block diagram of a power management scheme having a dual processor configuration wherein the high-level processor is in an active state, in accordance with some embodiments of the present invention.

FIG. 1 is an illustration of an embodiment of the present invention implemented in a dual processor mobile electronic communication device 100 operating in a state where the high-level processor subsystem 108 is active and running both high-level applications 124 and regular low-level system tasks 122 via the embedded operating system 114, and the proxy software module 118 running on the base-band processor sub-system 106 via the real time operating system 112 is inactive (i.e., terminated).

The mobile electronic communication device 100 as illustrated comprises both hardware 104 and software 102 resources. The mobile electronic communication device 100 hardware resources 104 include a base-band processor subsystem 106 containing a base-band processor (e.g., a communications processor) having low power consumption requirements, a high-level processor subsystem 108 containing a high-level processor (e.g., an applications processor) having higher power consumption requirements, and hardware resources 110 (e.g., LCD Buffers, GPIOs, Mini-LCD Buffers, communication interfaces, memory) shared between hardware subsystems 106 and 108. The mobile electronic communication device 100 software resources 102 include an embedded operating system 114 running on the high-level processor subsystem 108, a real time operating system 112 running on the base-band processor subsystem 106, and software resources 116 (e.g., data structures, register information) shared between software operating systems 112 and 114.

In the operating state illustrated, the high-level processor in the high-level processor subsystem 108 is in an active state, controlling via the embedded operating system 114 active high level applications 124 and regular low-level system tasks 122. The base-band processor in the base-band processor subsystem 106 in this operating state is running both active communications applications 120 and the proxy software module 118 via the real time operating system 112. As illustrated, the proxy software module 118, having the capability of controlling regular low-level system tasks 122 independently from the high-level processor subsystem 108, is in an inactive (i.e, terminated) state.

Figure 2:
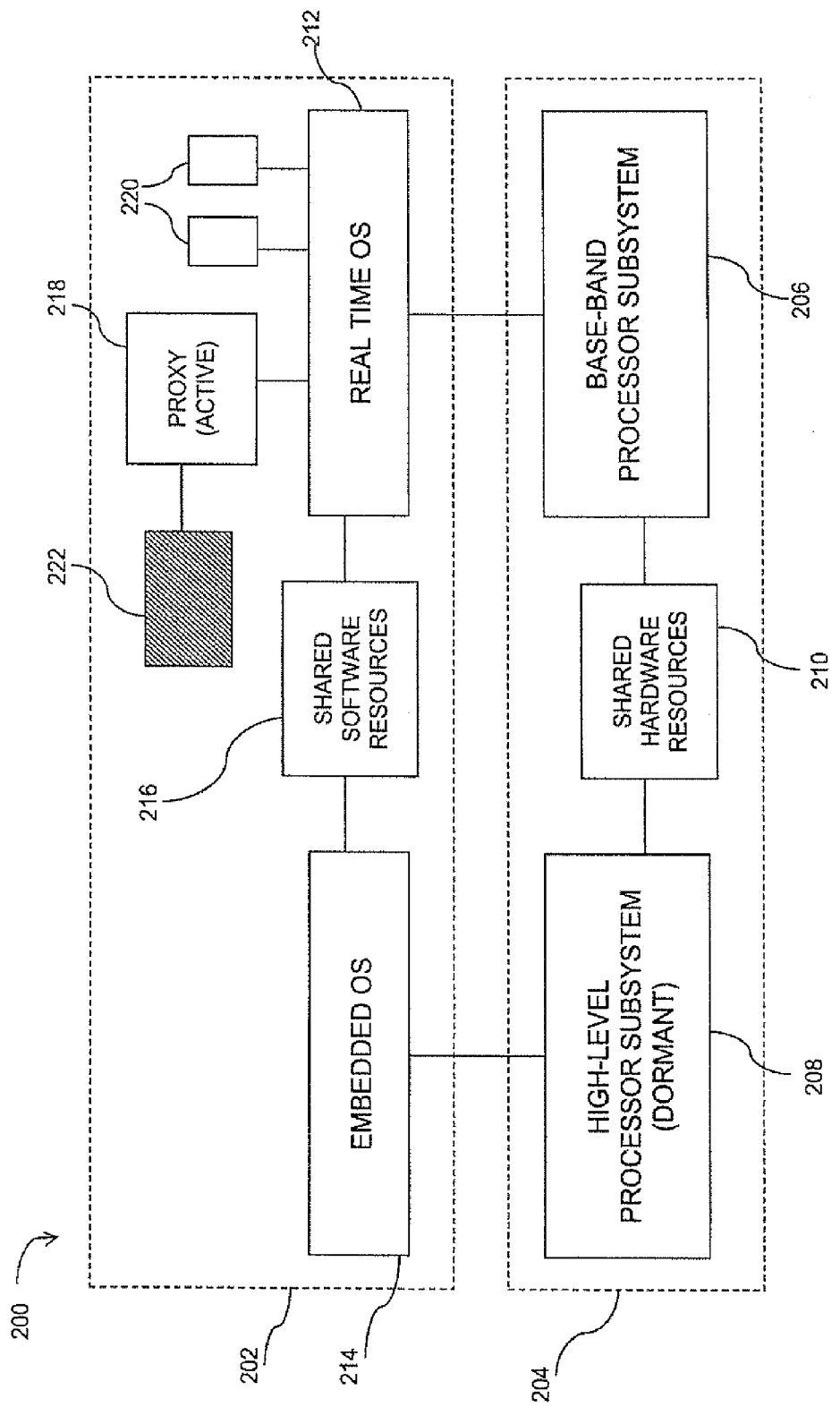
FIG. 2 is a functional block diagram of a power management scheme having a dual processor configuration wherein the high-level processor is in a dormant low power state, in accordance with some embodiments of the present invention.

FIG. 2 is an illustration of an embodiment of the present invention implemented in a dual processor mobile electronic communication device 200 operating in a state where the high-level processor subsystem 208 is in a dormant low power state (i.e., inactive), and the proxy software module 218 running on the base-band processor sub-system 206 via the real time operating system 212, is controlling regular low-level system tasks 222 independently from the high-level processor subsystem 208.

The mobile electronic communication device 200 as illustrated comprises both hardware 204 and software 202 resources. The mobile electronic communication device 200 hardware resources 204 include a base-band processor subsystem 206 containing a base-band processor (e.g., a communications processor) having low power consumption requirements, a high-level processor subsystem 208 containing a high-level processor (e.g., an applications processor) having higher power consumption requirements, and hardware resources 210 (e.g., LCD Buffers, GPIOs, Mini-LCD Buffers, communication interfaces, memory) shared between the two hardware subsystems 206-208. The mobile electronic communication device 200 software resources 202 include an embedded operating system 214 running on the high-level processor subsystem 208, a real time operating system 212 running on the base-band processor subsystem 206, and software resources 216 (e.g., data structures, register information) shared between the two software operating systems 212-214.

In the operating state illustrated, the high-level processor in the high-level processor subsystem 208 is in a dormant low power state (i.e., inactive), offering a reduction in overall device power consumption. The base-band processor in the base-band processor subsystem 206 is running both active communications applications 220 and the proxy software module 218 via the real time operating system 212. In this operating state, the proxy software module 218 is in an active state and is controlling regular low-level system tasks 222 independently from the high-level processor subsystem 208. Regular low-level system tasks 222 may include, for example, signal strength updating, system time updating, and any other low-level periodic device tasks.

Figure 3:
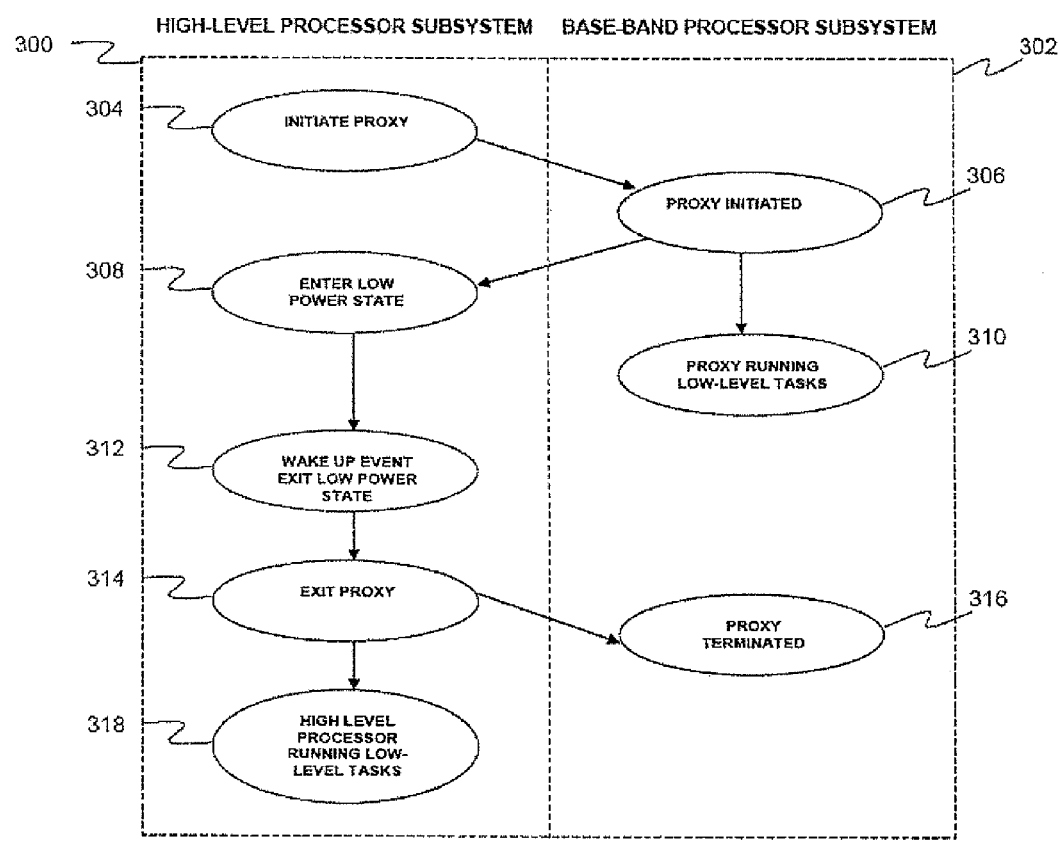
FIG. 3 is a flowchart illustrating the hand-shaking between the high level processor subsystem and the base-band processor subsystem system in accordance with some embodiments of the present invention.

FIG. 3 is a flowchart illustrating a method of hand-shaking between the high-level processor subsystem 300 and the base-band processor 302 subsystem in a device utilizing the present invention. When the high-level processor subsystem 300 enters a long duration idle state, for example, by a lack of active-high level applications or by a user request (e.g., via GPIOs), the proxy software module is initiated 304 by the high-level processor subsystem 300. Once the proxy software module has been initiated 306 on the base-band processor subsystem 302 and has begun controlling regular low-level system tasks 310 independently from the high-level processor subsystem 300, the high-level processor subsystem 300 enters a dormant low power state 308.

Upon the occurrence of a wake-up event 312 such as the initiation of a high-level application or a user request (e.g., via GPIOs), the high-level processor subsystem 300 exits a dormant low power state 312 and returns to an active state. The proxy software module is exited 314 by the high-level processor subsystem 300, and terminates 316 (i.e., becomes inactive) on the base-band processor subsystem 302. Subsequently, the high-level processor subsystem 300 resumes control of running low-level system tasks 318.

Figure 4:
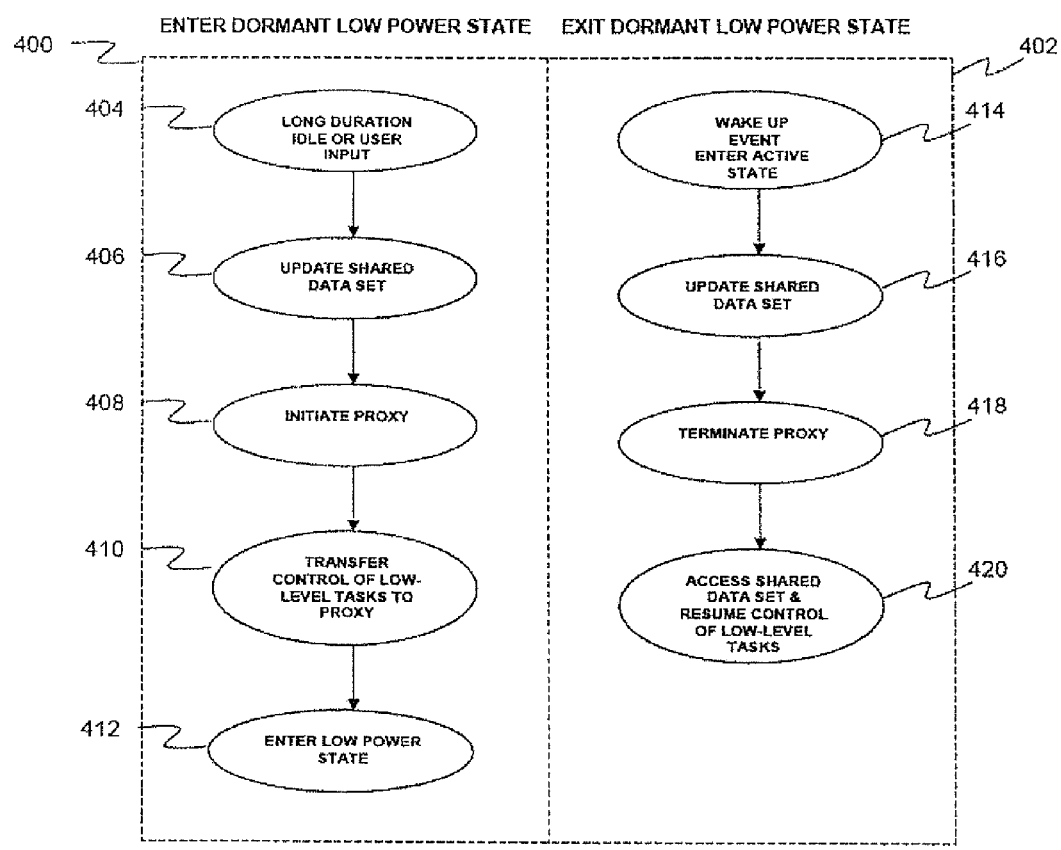
FIG. 4 is a flowchart illustrating function calls in the high-level processor while entering and exiting a dormant low power state in accordance with some embodiments of the present invention.

FIG. 4 is a flowchart illustrating function calls in a high-level processor 300 in a mobile electronic device utilizing the present invention while entering 400 and exiting 402 a dormant low power state. When the high-level processor subsystem enters a long duration idle state 404, for example, by a lack of active-high level applications or by a user request (e.g., via GPIOs), a data set shared between processor subsystems containing necessary information to run regular low-level system tasks (e.g., active IP addresses and port locations, network connection state information, system time information) is updated 406 by the high-level processor subsystem. The proxy software module is initiated 408 on the base-band processor subsystem, and after accessing the shared data set, takes control of running regular low-level system tasks from the high-level processor 410. Once control of regular low-level system tasks has been transferred to the proxy software module 410, the high-level processor subsystem is switched to a dormant low power state 412.

Upon the occurrence of a wake-up event 414, such as the initiation of a high-level application or a user request (e.g., via GPIOs), the high-level processor exits the dormant low power state and returns to the active state. The proxy software module updates the shared data 416 set containing necessary information to run regular low-level system tasks (e.g., active IP addresses and port locations, network connection state information, system time information) and terminates 418 (i.e., becomes inactive). After accessing the shared data set, the high-level processor resumes control of regular low-level system tasks 420.

The systems and methods disclosed herein are not inherently related to any particular computer or other apparatus, and may be implemented by a suitable combination of hardware, software, and/or firmware. Software implementations may include one or more computer programs. A computer program is a set of instructions readable and executable by a processor and can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network. Software may also be implemented as a computer program product, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing a device having a plurality of processors, the method comprising:
 transferring control of certain tasks from a first processor of the plurality of processors to a proxy software module operating on a second processor of the plurality of processors;
 in response to having transferred control of the certain tasks from the first processor to the proxy software module, switching the first processor from an active state to a dormant power state;
 (i) subsequent to switching the first processor from the active state to the dormant power state and (ii) in response to detecting a wake up event, switching the first processor from the dormant power state to the active state; and
 in response to switching the first processor from the dormant power state to the active state,
  updating, by the proxy software module, a data set shared between the first processor and the proxy software module, wherein the data set contains information associated with running the certain tasks,
  accessing the data set by the first processor, and
  transferring control of the certain tasks from the proxy software module to the first processor.

2. The method of claim 1, wherein the certain tasks are low-level system tasks.

3. The method of claim 1, wherein the certain tasks include at least one of updating device signal strength and updating system time.

4. The method of claim 1, wherein the transferring control of certain tasks from the first processor to the proxy software module operating on the second processor is initiated when the first processor enters an idle state.

5. The method of claim 4, wherein the first processor enters the idle state when the first processor is not running any active tasks.

6. The method of claim 4 wherein the first processor enters the idle state in response to a user request.

7. The method of claim 1, wherein the information associated with running the certain tasks includes at least one of active IP addresses, active port locations, network connection state information and system time information.

8. The method of claim 1, wherein:
the first processor has first power consumption requirements;
the second processor has second power consumption requirements; and
the first power consumption requirements are greater than the second power consumption requirements.

9. The method of claim 1, further comprising:
in response to updating, by the proxy software module, the data set, terminating the proxy software module.

10. The method of claim 1, wherein transferring control of the certain tasks from the first processor to the proxy software module comprises:
updating, by the first processor, the data set shared between the first processor and the proxy software module;
initiating the proxy software module; and
in response to (i) updating, by the first processor, the data set shared between the first processor and the proxy software module and (ii) initiating the proxy software module, transferring control of the certain tasks from the first processor to the proxy software module.

11. An apparatus comprising:
a plurality of processors, wherein the plurality of processors includes a first processor and a second processor;
a memory; and
instructions stored in the memory that enable the apparatus to
transfer control of certain tasks from the first processor to a proxy software module operating on the second processor,
in response to having transferred control of the certain tasks from the first processor to the proxy software module, switch the first processor from an active state to a dormant power state,
(i) subsequent to switching the first processor from the active state to the dormant power state and (ii) in response to detecting a wake up event, switch the first processor from the dormant power state to the active state, and
in response to switching the first processor from the dormant power state to the active state,
update a data set shared between the first processor and the proxy software module, wherein the data set contains information associated with running the certain tasks,
access the data set by the first processor, and
transfer control of the certain tasks from the proxy software module to the first processor.

12. The apparatus of claim 11, wherein the first processor is a high-level processor.

13. The apparatus of claim 11, wherein the second processor is a base-band processor.

14. The apparatus of claim 11, wherein the certain tasks are low level system tasks.

15. The apparatus of claim 11, wherein the certain tasks include at least one of updating device signal strength and updating system time.

16. The apparatus of claim 11, wherein the first processor enters an idle state when the first processor is not running any active tasks.

17. The apparatus of claim 11, wherein the first processor enters an idle state by a user request.

18. The apparatus of claim 11, wherein the information associated with running the certain tasks includes at least one of active IP addresses, port locations, network connection state information and system time information.

19. The apparatus of claim 11, wherein:
the first processor has first power consumption requirements;
the second processor has second power consumption requirements; and
the first power consumption requirements are greater than the second power consumption requirements.

20. The apparatus of claim 11, wherein instructions stored in the memory further enable the apparatus to:
in response to updating the data set, terminate the proxy software module.

21. The apparatus of claim 11, wherein instructions stored in the memory enable the apparatus to transfer control of the certain tasks from the first processor to the proxy software module by:
updating, by the first processor, the data set shared between the first processor and the proxy software module;
initiating the proxy software module; and
in response to (i) updating, by the first processor, the data set shared between the first processor and the proxy software module and (ii) initiating the proxy software module, transferring control of the certain tasks from the first processor to the proxy software module.

* * * * *